United States Patent
Oh et al.

(10) Patent No.: US 9,246,725 B2
(45) Date of Patent: Jan. 26, 2016

(54) METHOD OF GENERATING AND RECEIVING PACKETS IN LOW ENERGY CRITICAL INFRASTRUCTURE MONITORING SYSTEM

(75) Inventors: Mi Kyung Oh, Daejeon (KR); Young Ae Jeon, Daejeon (KR); Sangjae Lee, Daejeon (KR); Jaehwan Kim, Daejeon (KR); Cheol-ho Shin, Daejeon (KR); Byoung Hak Kim, Daejeon (KR); Seung Sik Lee, Daejeon (KR); Sangsung Choi, Daejeon (KR); Jae Young Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 515 days.

(21) Appl. No.: 13/605,230

(22) Filed: Sep. 6, 2012

(65) Prior Publication Data
US 2013/0058360 A1    Mar. 7, 2013

(30) Foreign Application Priority Data

Sep. 6, 2011 (KR) ......... 10-2011-0090289
Sep. 14, 2011 (KR) ......... 10-2011-0092608
Sep. 6, 2012 (KR) ......... 10-2012-0098745

(51) Int. Cl.
*H04L 27/12* (2006.01)
*H04L 27/14* (2006.01)
*H04L 1/00* (2006.01)

(52) U.S. Cl.
CPC ......... *H04L 27/12* (2013.01); *H04L 1/007* (2013.01); *H04L 1/0009* (2013.01); *H04L 1/0071* (2013.01); *H04L 1/0072* (2013.01); *H04L 27/14* (2013.01); *H04L 1/0054* (2013.01); *H04L 1/0059* (2013.01)

(58) Field of Classification Search
CPC ......... H04L 1/0009
USPC ......... 370/537, 338, 206, 447, 468, 503, 442, 370/474, 273, 208, 337, 445, 315; 375/341, 375/261, 272, 303, 365, 141, 267, 144, 150, 375/259, 279, 239, 269, 295, 224, 273
See application file for complete search history.

(56) References Cited

U.S. PATENT DOCUMENTS

| | | | | |
|---|---|---|---|---|
| 4,748,626 | A * | 5/1988 | Wong | 714/746 |
| 4,807,230 | A * | 2/1989 | Srinivasagopalan et al. | 714/789 |
| 4,891,806 | A * | 1/1990 | Farias et al. | 370/503 |

(Continued)

OTHER PUBLICATIONS

Oh, Mi-Kyung et al., "ETRI NB PHY proposal for TG4k LECIM networks," doc.: IEEE 802.15/11/0609-00-004k, 34 pages (2011).

(Continued)

*Primary Examiner* — Parth Patel
(74) *Attorney, Agent, or Firm* — Nelson Mullins Riley & Scarborough LLP

(57) ABSTRACT

A method of generating a packet for low energy critical infrastructure monitoring (LECIM) wireless communication is provided. The method includes steps of generating a first bit string by multiplexing a physical layer header (PHR) bit and a physical layer service data unit (PSDU) bit; convolution encoding the first bit string; interleaving the convolution-encoded first bit string; generating a second bit string by multiplexing the interleaved first bit string with a synchronization header (SHR) bit; and modulating the second bit string with a frequency shift keying (FSK) method and a position-based FSK method.

20 Claims, 9 Drawing Sheets

(56) References Cited

U.S. PATENT DOCUMENTS

| | | | | |
|---|---|---|---|---|
| 5,790,555 A * | 8/1998 | Narahashi et al. | | 370/480 |
| 5,963,599 A * | 10/1999 | Curtis et al. | | 375/341 |
| 6,430,228 B1 * | 8/2002 | Zhang | | 375/261 |
| 6,584,164 B1 * | 6/2003 | Tuukkanen | | 375/365 |
| 6,763,057 B1 * | 7/2004 | Fullerton et al. | | 375/141 |
| 6,967,993 B1 * | 11/2005 | Miller | | 375/150 |
| 7,054,296 B1 * | 5/2006 | Sorrells et al. | | 370/338 |
| 7,065,036 B1 * | 6/2006 | Ryan | | 370/208 |
| 7,263,105 B2 * | 8/2007 | Trainin | | 370/445 |
| 7,639,687 B1 * | 12/2009 | Tsai et al. | | 370/392 |
| 8,315,326 B2 * | 11/2012 | Agee et al. | | 375/267 |
| 8,391,228 B2 * | 3/2013 | Batra et al. | | 370/329 |
| 8,774,306 B2 * | 7/2014 | Oh et al. | | 375/273 |
| 2002/0015420 A1 * | 2/2002 | Yoon et al. | | 370/468 |
| 2002/0075145 A1 * | 6/2002 | Hardman et al. | | 340/442 |
| 2002/0136231 A1 * | 9/2002 | Leatherbury et al. | | 370/442 |
| 2003/0008613 A1 * | 1/2003 | Karr et al. | | 455/11.1 |
| 2003/0076855 A1 * | 4/2003 | Chamberlain | | 370/447 |
| 2003/0091121 A1 * | 5/2003 | Kenmochi | | 375/272 |
| 2003/0102960 A1 * | 6/2003 | Beigel et al. | | 340/10.1 |
| 2003/0206602 A1 * | 11/2003 | Yamamoto | | 375/303 |
| 2004/0051652 A1 * | 3/2004 | Nakao et al. | | 341/100 |
| 2004/0100897 A1 * | 5/2004 | Shattil | | 370/206 |
| 2004/0120292 A1 * | 6/2004 | Trainin | | 370/338 |
| 2004/0128608 A1 * | 7/2004 | Kim et al. | | 714/763 |
| 2004/0136401 A1 * | 7/2004 | Ichino | | 370/473 |
| 2004/0179557 A1 * | 9/2004 | Tong et al. | | 370/537 |
| 2004/0240575 A1 * | 12/2004 | Rainbolt | | 375/267 |
| 2005/0078764 A1 * | 4/2005 | Gresset et al. | | 375/267 |
| 2005/0163256 A1 * | 7/2005 | Kroeger | | 375/300 |
| 2005/0180492 A1 * | 8/2005 | Dent | | 375/144 |
| 2006/0008085 A1 * | 1/2006 | Matsuo | | 380/34 |
| 2006/0045191 A1 * | 3/2006 | Vasanth et al. | | 375/259 |
| 2006/0098755 A1 * | 5/2006 | Kluesing et al. | | 375/279 |
| 2006/0176860 A1 * | 8/2006 | Marin et al. | | 370/337 |
| 2007/0165741 A1 * | 7/2007 | Zeng | | 375/272 |
| 2008/0043856 A1 * | 2/2008 | Cho et al. | | 375/259 |
| 2008/0095121 A1 * | 4/2008 | Shattil | | 370/335 |
| 2008/0260019 A1 * | 10/2008 | Aoyagi | | 375/239 |
| 2009/0116462 A1 * | 5/2009 | Powell et al. | | 370/338 |
| 2009/0147724 A1 * | 6/2009 | Nimbalker et al. | | 370/315 |
| 2009/0154589 A1 * | 6/2009 | Monnerie | | 375/269 |
| 2009/0225894 A1 * | 9/2009 | Yoshii et al. | | 375/295 |
| 2009/0299532 A1 * | 12/2009 | Zyren | | 700/276 |
| 2010/0040135 A1 * | 2/2010 | Yoon et al. | | 375/240.01 |
| 2010/0124269 A1 * | 5/2010 | Lee et al. | | 375/239 |
| 2010/0232535 A1 * | 9/2010 | Yue et al. | | 375/267 |
| 2011/0116534 A1 * | 5/2011 | Seibert et al. | | 375/224 |
| 2011/0119567 A1 * | 5/2011 | Tu et al. | | 714/786 |
| 2011/0150044 A1 * | 6/2011 | Rousseaux et al. | | 375/147 |
| 2011/0255453 A1 * | 10/2011 | Roh et al. | | 370/310 |
| 2011/0255557 A1 * | 10/2011 | Varadarajan et al. | | 370/474 |
| 2012/0155349 A1 * | 6/2012 | Bajic et al. | | 370/311 |
| 2012/0155415 A1 * | 6/2012 | Seok | | 370/329 |
| 2012/0163444 A1 * | 6/2012 | Oh et al. | | 375/239 |
| 2012/0319874 A1 * | 12/2012 | Jang et al. | | 341/52 |
| 2013/0058360 A1 * | 3/2013 | Oh et al. | | 370/474 |
| 2013/0107912 A1 * | 5/2013 | Ponnampalam | | 375/147 |

OTHER PUBLICATIONS

Oh, Mi-Kyung et al., "Position-Based FSK Scheme Toward Power-Saving Transmission in LECIM Networks," IEEE Communications Letters, vol. 106(2):183-185 (2012).

\* cited by examiner

METHOD OF GENERATING AND RECEIVING PACKETS IN LOW ENERGY CRITICAL INFRASTRUCTURE MONITORING SYSTEM

CROSS-REFERENCE TO RELATED APPLICATION

This application claims priority to and the benefit of Korean Patent Application Nos. 10-2011-0090289, 10-2011-0092608, and 10-2012-0098745 filed in the Korean Intellectual Property Office on Sep. 6, 2011, Sep. 14, 2011, and Sep. 6, 2012, the entire contents of which are incorporated herein by reference.

BACKGROUND OF THE INVENTION (a) Field of the Invention

The present invention relates to a method of generating and receiving a packet in a low energy critical infrastructure monitoring (LECIM) system.

(b) Description of the Related Art

FIG. 1 is a diagram illustrating an LECIM wireless network.

Referring to FIG. 1, the LECIM wireless network includes a mains-powered coordinator and a plurality of battery-powered endpoint devices.

The mains-powered coordinator is connected to another mains-powered coordinator and manages a plurality of battery-powered endpoint devices.

The plurality of battery-powered endpoint devices are connected to the mains-powered coordinator. Even if a plurality of battery-powered endpoint devices are not managed by manpower, the plurality of battery-powered endpoint devices should operate for several years and thus the plurality of battery-powered endpoint devices should have excellent low power characteristics. Further, because a communication radius is several hundreds m to several km, the plurality of battery-powered endpoint devices should maintain a reliable communication quality even in a wireless environment having a serious path loss.

A frequency band to operate the LECIM wireless device may be locally different, and the LECIM wireless device is worldwidely operated in a frequency band of 868-870 MHz, 902-928 MHz, and 2400-2483.5 MHz. In the Republic of Korea, 917-923.5 MHz bands that can radiate transmission power of maximum 10 dBm are used as an operation frequency for the LECIM wireless device.

FIG. 2 is a graph illustrating a path loss according to a distance in an LECIM wireless network.

In FIG. 2, in a 900 MHz operation band, an Okumura-Hata model was selected as an LECIM channel model according to a distance. In a 900 MHz band, when a coordinator was positioned at a height of 30 m and an endpoint device was positioned at a height of 2 m, a path loss was displayed according to urban_mid/small, urban_large, suburban, and rural environments.

Referring to FIG. 2, in urban_large, in a distance of 1 km, a path loss was about 125 dB. In urban_large, a path loss of about 30 dB occurs further than in free space, and an urban_large environment is a poorer condition than a channel environment of existing other wireless systems. Therefore, even if a mains-powered coordinator having excellent transmitting/receiving characteristics has a beam-forming gain and an antenna diversity gain, a very weak signal may be received in a receiving terminal

TABLE 1

Received power calculated in 900 MHz band and urban_large channel environments

| | | Notes |
|---|---|---|
| Channel Model Parameters | | |
| Frequency (MHz) | 900 | Valid Range 150~2400 MHz |
| Collector Antenna Height (m) | 30 | Hata Valid Range 30-200 m, including terrain. Erceg Valid Range 10-80 m, including terrain. |
| endpoint Antenna Height (m) | 2 | Hata Valid Range 1-10 m, Erceg Fixed to 2 m. |
| Distance (km) | 1 | Valid Range 1-20 km |
| Downlink Path Loss Calculation | | |
| Collector Tx Power (dBm) | 10 | Subject to Tx power regulations |
| Collector Tx Antenna Gain (dBi) | 6 | Subject to Tx power regulations |
| Path Loss (dB) | −125.40 | Must reference the right path loss from the Hata or Erceg worksheet |
| Shadowing Margin (dB) | −12 | To buffer against variable shadowing loss |
| Penetration Loss (dB) | 0 | For underground vaults, etc. |
| Endpoint Rx Antenna Gain (dBi) | 2 | If using same antenna for Tx, must be same as in Uplink table |
| Endpoint interference (dB) | 1 | Rise over Thermal interference |
| Rx power at Endpoint (dBm) | −118.40 | Compare against Rx sensitivity |
| Uplink Path Loss Calculation | | |
| Endpoint Tx Power (dBm) | 10 | Subject to Tx power regulations, Can be different from Collector |
| Endpoint Tx Antenna Gain (dBi) | 2 | Subject to Tx power regulations |
| Penetration Loss (dB) | 0 | For underground vaults, etc. |
| Path Loss (dB) | −125.40 | Same as Downlink |
| Shadowing Margin (dB) | −12 | Same as Downlink |
| Collector Rx Antenna Gain (dBi) | 6 | If using same antenna for Tx, must be same as in Downlink table |
| Collector interference (dB) | 2 | Rise over Thermal interference |
| Rx power at Collector (dBm) | −117.40 | Compare against Rx sensitivity |

Table 1 represents received power that is calculated in 900 MHz band and urban_large channel environments. In Table 1, in urban_large of the Republic of Korea, when transmitting a signal with 10 dBm, a weak signal of about −117 dBm to −118 dBm was received in the receiving terminal.

Intensity of a signal may be changed according to a channel bandwidth, but when such a weak signal is received, if a signal to noise ratio (SNR) is measured in the receiving antenna, the SNR may be 0 dB or less and thus it may be difficult to restore a received signal. Accordingly, in order to restore a weak received signal, by introducing a narrow band physical layer (PHY) that may lower a noise level in the receiving terminal, using a high performance modulation method, and using a method such as channel coding, spreading, and packet repetition or re-transmission, an SNR should be increased.

However, as described above, in order to restore a received signal, when a high performance of transmitting/receiving technique is used, there is a problem that it is difficult to maintain low power characteristics.

SUMMARY OF THE INVENTION

The present invention has been made in an effort to provide a method of generating and transmitting a packet of an LECIM wireless communication system having advantages of guaranteeing reliability of a communication quality and enabling an endpoint device to use low power in a channel environment having a large communication radius and a serious path loss.

An exemplary embodiment of the present invention provides a method of modulating a transmission signal in a transmitter, the method including: dividing a bit string of the transmission signal into at least four bit groups: allocating a modulation frequency to each bit group; allocating a position to be transmitted in a duration of a symbol to each bit group; modulating each bit group to an allocated modulation frequency and an allocated position; and transmitting the modulated bit group.

Another exemplary embodiment of the present invention provides a method of generating a packet in a transmitter, the method including: generating a first bit string by multiplexing a physical layer header (PHR) bit and a physical layer service data unit (PSDU) bit; encoding the first bit string; interleaving the encoded first bit string; generating a second bit string by multiplexing the interleaved first bit string with a synchronization header (SHR) bit; and modulating the second bit string with at least one of a frequency shift keying (FSK) method and a method in which position information is reflected to the FSK method.

Yet another exemplary embodiment of the present invention provides a method of receiving a packet in a receiver, the method including: demodulating a packet that is received from an antenna with at least one of a frequency shift keying (FSK) method and a method in which position information is reflected to the FSK method; de-interleaving the demodulated packet; decoding the de-interleaved packet; and demultiplexing the decoded packet to a physical layer header (PHR) bit and a physical layer service data unit (PSDU) bit.

DETAILED DESCRIPTION OF THE EMBODIMENTS

Figure 1:
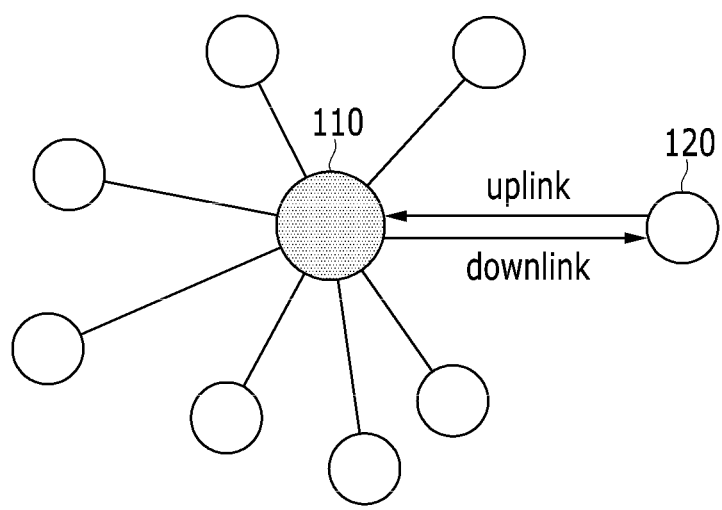
FIG. 1 is a diagram illustrating an LECIM wireless network.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In an entire specification, a terminal may indicate a mobile terminal (MT), a mobile station (MS), a subscriber station (SS), a portable subscriber station (PSS), an access terminal (AT), and an user equipment (UE) and may include an entire function or a partial function of the MT, the MS, the SS, the PSS, the AT, and the UE.

Further, a base station (BS) may indicate a node B, an evolved node B (eNodeB), an access point (AP), a radio access station (RAS), a base transceiver station (BTS), and a mobile multihop relay (MMR)-BS and may include an entire function or a partial function of the node B, the eNodeB, the AP, the RAS, the BTS, and the MMR-BS.

Figure 3:
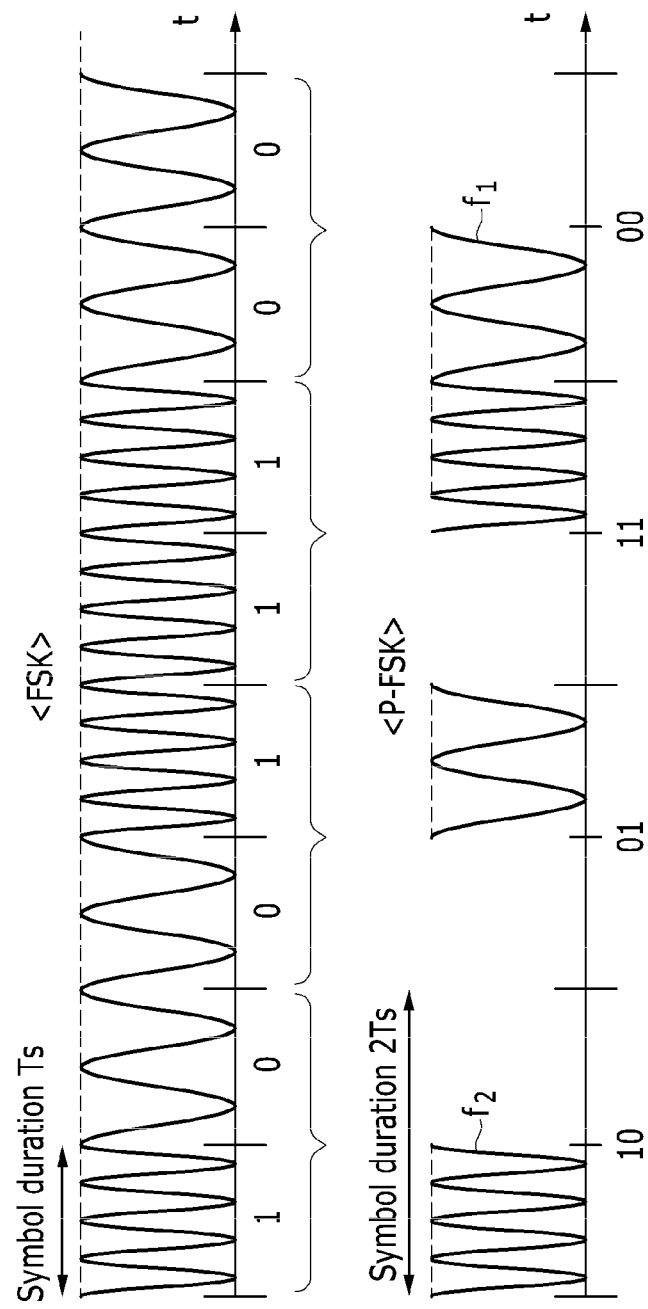
FIG. 3 is a diagram illustrating a waveform of a P-FSK method according to an exemplary embodiment of the present invention.

FIG. 3 is a diagram illustrating a waveform of a P-FSK method according to an exemplary embodiment of the present invention.

Referring to FIG. 3, signal modulation according to an exemplary embodiment of the present invention is performed based on an FSK method. An FSK system is a typical narrowband PHY and has a merit that a high-linearity power amplifier of large power consumption may not be used and a configuration of a non-coherent receiver of low power and low complexity that may not track a carrier phase can be formed.

Further, an FSK-based narrowband PHY may have channel diversity in a predetermined operation frequency band. For example, in a 902 MHz band, total 162 channels may be allocated, and in a 2.4 GHz band, total 521 channels may be allocated. Therefore, in order to simultaneously form a plurality of LECIM networks in a same area, when allocating a channel, or in order to avoid interference with other wireless systems existing within a same band, when allocating another channel, it is advantageous that many channels are available.

Particularly, because a performance difference between an optimal coherent receiver and a non-coherent receiver is about 1 dB, there is a merit that a low power receiver in which a degradation level of a performance is not large can be embodied.

However, generally, because FSK has a low performance, compared with binary phase shift keying (BPSK), in order to supplement such a drawback, in an exemplary embodiment of the present invention, a position-based FSK (hereinafter, referred to as a 'P-FSK') is together used.

A P-FSK method according to an exemplary embodiment of the present invention is a combination of 2-level FSK, which is orthogonal signaling in a frequency domain and a 2-ary pulse-position modulation method, which is orthogonal signaling in a time domain. According to the P-FSK method, while maintaining a bit rate and a signal bandwidth, a 4-dimension orthogonal signal may be generated, and by lowering an SNR per necessary bit, a target bit error rate (target BER) may be obtained.

Referring to FIG. 3, a P-FSK method according to an exemplary embodiment of the present invention is a method of simultaneously transmitting 2 bits, transmitting 1 bit to FSK and transmitting the remaining 1 bit by loading information in a position and transmitting a signal. That is, in the FSK method, 1 bit of 0 or 1 is transmitted for a symbol duration $T_s$, but in the P-FSK method, 2 bits are transmitted for $2T_s$.

For example, a bit string is divided into four bit groups of 00, 01, 10, and 11. When a frequency $f_1$ is allocated to 00 and 01 and a frequency $f_2$ is allocated to 10 and 11, in 00 and 10, a signal is transmitted with each frequency of $f_1$ and $f_2$ at a first half of $2T_s$, and in 01 and 11, a signal is transmitted with each frequency of $f_1$ and $f_2$ at a second half of $2T_s$. That is, a front bit is determined according to a frequency, and a back bit is determined according to a position of a duration of a symbol. Finally, because a P-FSK method basically uses an FSK method, a P-FSK transmitter does not increase complexity, compared with an FSK transmitter.

In this case, a signal that is modulated with an existing FSK method is represented by Equation 1.

$$s_k^{FSK}(t) = \sqrt{\frac{2E_b}{T_s}} \, p(t-kT_s) \cdot \cos[2\pi(f_c + b_k \Delta f)t] \quad \text{(Equation 1)}$$

In Equation 1, p(t) is a rectangular pulse of a width $T_s$ corresponding to a symbol rate, $E_b$ is energy per bit, $f_c$ is a carrier frequency, and $\Delta f$ is frequency deviation. $b_k$ is an input data bit corresponding to 0 or 1.

However, a signal that is modulated with the P-FSK method is represented by Equation 2.

$$s_n^{P-FSK}(t) = \sqrt{\frac{2E_s}{T_s}} \cdot G(b_n^0, t)\cos[2\pi(f_c + b_n^1 \Delta f)t]G(b_n^0, t) = \quad \text{(Equation 2)}$$

$$p(t - n2T_s - b_n^0 T_s)$$

In Equation 2, G(b, t) is a gating function in which an on-off position can be determined according to an input data bit.

Figure 4:
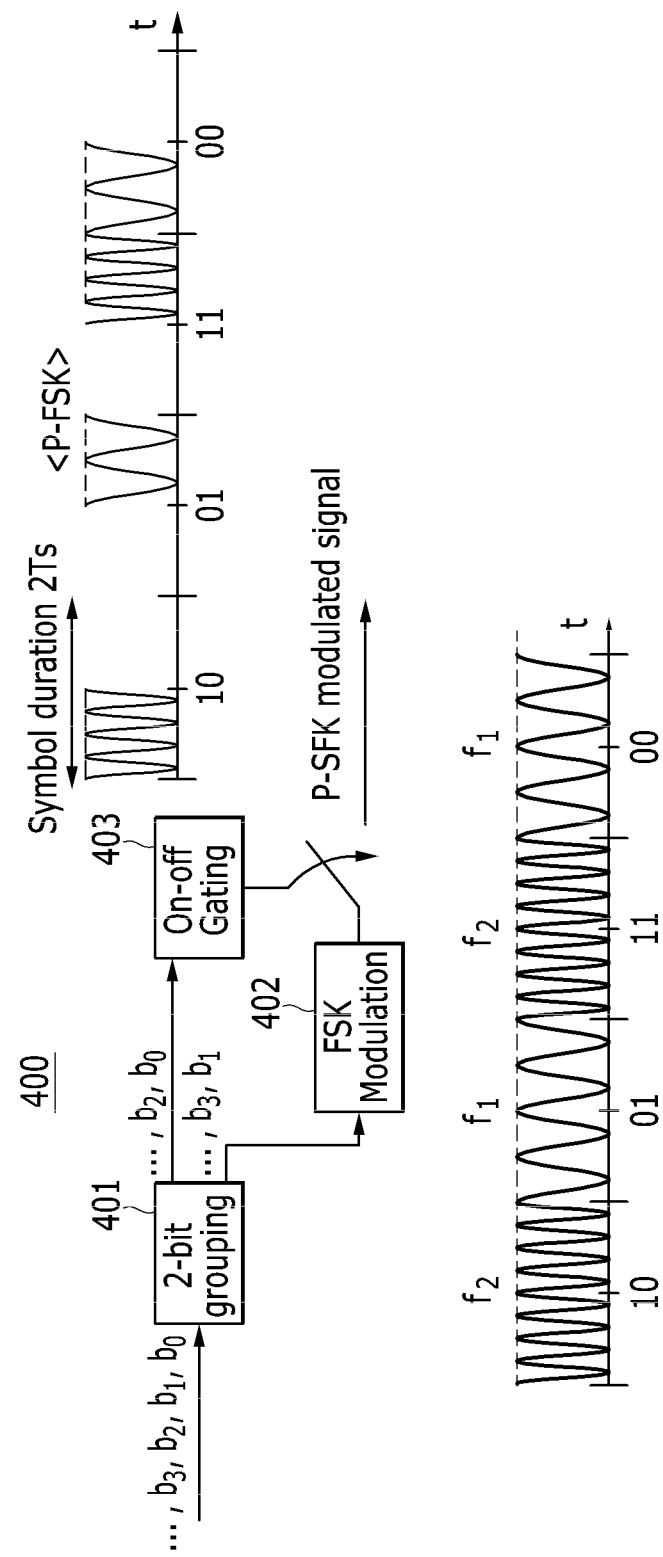
FIG. 4 is a block diagram illustrating a P-FSK modulation unit in which a P-FSK method is embodied according to an exemplary embodiment of the present invention.

FIG. 4 is a block diagram illustrating a P-FSK modulation unit in which a P-FSK method is embodied according to an exemplary embodiment of the present invention.

Referring to FIG. 4, a P-FSK modulation unit 400 in which a P-FSK method is embodied according to an exemplary embodiment of the present invention includes a 2-bit grouping unit 401, an FSK modulation unit 402, and an on-off gate 403.

A bit string that is input to the P-FSK modulation unit 400 is grouped by 2 bits in the 2-bit grouping unit 401, and in each bit group, a frequency in which each bit group is to be modulated and a position in a symbol duration is determined according to first bit and second bit information.

Referring to a lower end of the left side of FIG. 4, because a first bit is 0, '00' and '01' of a bit group are modulated with a first frequency $f_1$ in the FSK modulation unit 402, and because a first bit is 1, '10' and '11' are modulated with a second frequency $f_2$ in the FSK modulation unit. In this case, the first frequency and the second frequency are different.

Thereafter, a transmission position of a bit group that is modulated in the FSK modulation unit 402 is determined within a duration of a symbol through an on-off gate. Referring to an upper end of the right side of FIG. 4, because a second bit is 0, '00' and '10' are positioned at a back side in a duration of a symbol, and because a second bit is 1, '01' and '11' are positioned at a front side at a duration of a symbol.

In an exemplary embodiment of the present invention, a bit that determines a modulation frequency of two bits of a bit group is a first bit, and a bit that determines a position is a second bit, but a bit that determines a modulation frequency may be a second bit and a bit that determines a position may be a first bit.

Figure 2:
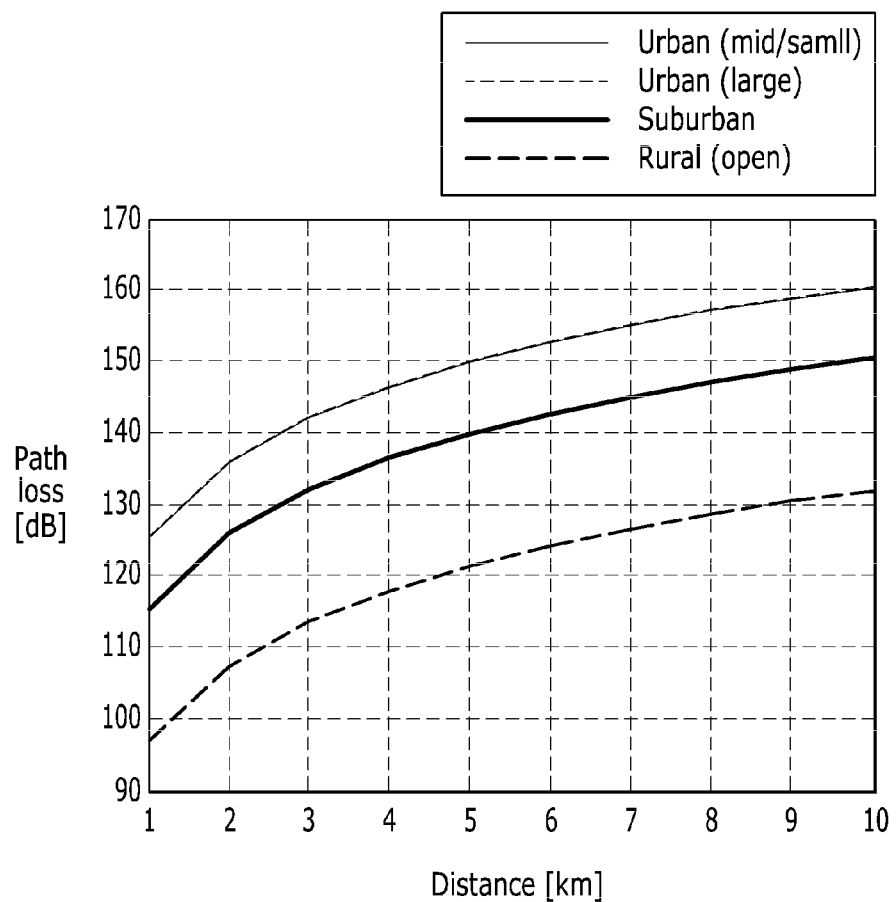
FIG. 2 is a graph illustrating a path loss according to a distance in an LECIM wireless network.

Further, in another exemplary embodiment of the present invention, a bit group that has a first bit and a second bit is mapped to one symbol. That is, Shown in the FIG. 2, bit groups including '00,', '01', '10' and '11' are mapped to the four symbols, respectively.

TABLE 2

| bit groups mapped to the symbols | | | | |
|---|---|---|---|---|
| bit group | Modulation freq. | Frequency deviation | Time deviation | Number of Symbol |
| 00 | $f_1$ | $-\Delta f$ | 0 | 1 |
| 01 | $f_1$ | $-\Delta f$ | Ts | 2 |
| 10 | $f_2$ | $+\Delta f$ | 0 | 3 |
| 11 | $f_2$ | $+\Delta f$ | Ts | 4 |

Thereafter, bits are combined according to position information within a symbol duration to be transmitted by operation of the on-off gate 403 and are output to a signal that is modulated with a P-FSK method.

Figure 5:
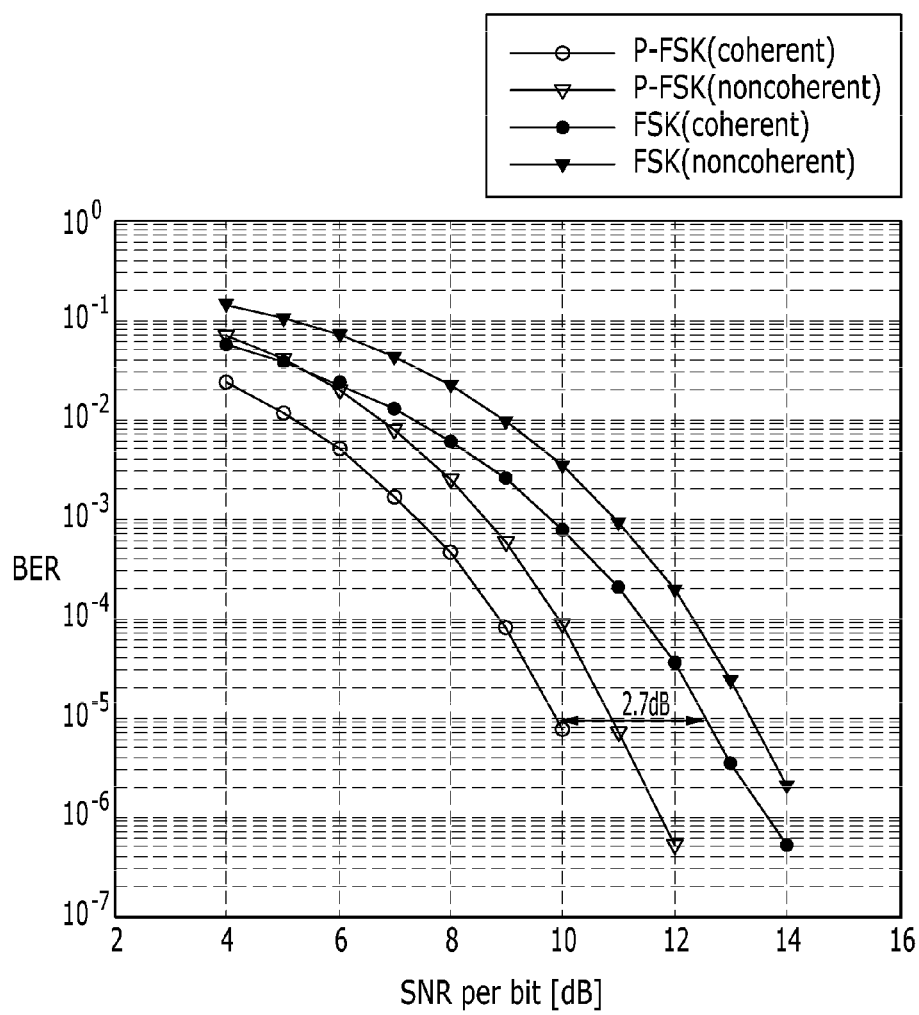
FIG. 5 is a graph comparing a performance of a P-FSK method with that of an FSK method according to an exemplary embodiment of the present invention.

FIG. 5 is a graph of comparing a performance of a P-FSK method with that of an FSK method according to an exemplary embodiment of the present invention.

In FIG. 5, a performance index is a BER and is illustrated according to an SNR per bit. All optimal coherent receiver and non-coherent receivers are used for demodulation of each signal.

Referring to FIG. 5, it can be seen that a BER of P-FSK, which is a 4-dimension orthogonal signaling method is further improved by about 2.7 dB at $10^{-5}$ than that of FSK, which is a 2-dimension orthogonal signaling method. It can be determined that a performance difference between a coherent receiver and a non-coherent receiver is about 1 dB.

Accordingly, in an exemplary embodiment of the present invention, the mains-powered coordinator uses an optimal coherent receiver, and a battery-powered endpoint device that receives a restriction of power consumption and that should have super low power characteristics uses a non-coherent receiver. This is because a non-coherent receiver can easily achieve low power characteristics and does not increase complexity of an embodied module. In this case, a non-coherent receiver for a P-FSK method has the same structure as that of a non-coherent receiver that is used in an existing FSK method, and in order to restore only a position bit, the non-coherent receiver may have some computational load.

Figure 6:
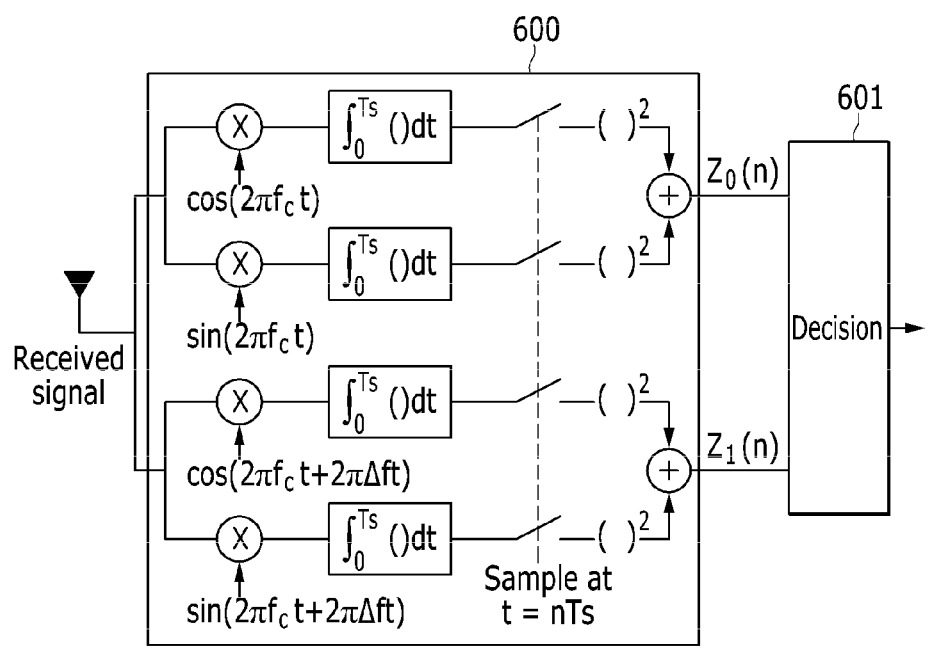
FIG. 6 is a block diagram illustrating a decision unit of a P-FSK receiver according to an exemplary embodiment of the present invention.

FIG. 6 is a block diagram illustrating a P-FSK receiving terminal according to an exemplary embodiment of the present invention.

Referring to FIG. 6, a received signal is input to a decision unit 601 via a signal processor 600. The decision unit 601 of a P-FSK receiver collects $\{Z_0(2n), Z_1(2n)\}$ and $\{Z_0(2n+1), Z_1(2n+1)\}$ for $2T_s$ and calculates energy through Equation 3 in each $T_s$.

$$\Delta Z(2n) := Z_0(2n) + Z_1(2n)$$

$$\Delta Z(2n+1) := Z_0(2n+1) + Z_1(2n+1) \quad \text{(Equation 3)}$$

By comparing $\Delta Z(n) := \Delta Z(2n) - \Delta Z(2n+1)$ with a decision threshold 0, a position bit is restored like Equation 4.

$$\hat{b}_n^0 = \begin{cases} 0, & \text{if } \Delta Z(n) \geq 0 \\ 1, & \text{if } \Delta Z(n) < 0 \end{cases} \quad \text{(Equation 4)}$$

Thereafter, a bit that is demodulated to an FSK may be restored using an FSK demodulation method in a time slot that restores a position bit.

Therefore, in the P-FSK receiver, a portion that calculates energy by adding a squared envelop in each $T_s$ and a portion that restores a position bit by comparing with a decision threshold 0 are added to an existing FSK receiver, but even if the above element is added, a complexity increase amount of hardware is very small.

In order to increase spectrum efficiency of a P-FSK signal, pulse shaping may be performed in a transmitting terminal. That is, when spectrum efficiency of a P-FSK signal is not good, adjacent interference may occur and thus a signal component may be removed from an out-band with pulse shaping.

Further, because an LECIM radio channel has a serious path loss and is largely affected by an environment change, an error correction capability is essential. In an LECIM radio channel, because a long burst error may occur more than a random bit error, an interleaver is also essential. When the interleaver is applied, if a channel environment or latency between a transmitting terminal and a receiving terminal is considered, an interleaver that applies to a PHR or a PSDU may be defined. When the interleaver is applied, the following case may be considered.

1. When Applying One Interleaver to an Entire Packet

If a change of a channel is serious and a receiving terminal has no time constraint in processing a receiving packet, this is a method that can increase to the maximum a decoding probability upon receiving. However, while a packet processing time is extended, a response to a packet to a transmitting terminal may be delayed (latency increase).

2. When Applying Respective Different Interleavers to a PHR and a PSDU of a Packet Because the PHR defines a length or a format of the remaining received signals, the PHR should be able to be very quickly found out. When decoding of the PHR is quickly performed, power that is consumed in a receiver may be reduced and thus an interleaver length of the PHR may be applied differently from that of the PSDU.

That is, the interleaver of the PHR may be shortly defined to include only the PHR, and in consideration of delay that can be allowed in a receiving terminal, the interleaver may be defined to include even a portion of the PSDU. In this case, the interleaver length is determined according to the bit length of an encoded PHR.

For the PSDUs, when a length of an entire interleaver is set, a random interleaver length may be set to a default. For example, in a specification, a predetermined length may be set to a default or the same length as that of the PHR may be set to a default of an interleaver length. In this case, an interleaver length of a changing PSDU may have a form in which the PHR directly notifies a value.

A default value of an interleaver length of the PSDU may be set randomly, and the PHR additionally includes a value that determines a range of the PSDU, performed the interleaving. Further, the PHR may define the interleavers applied to the range of the PSDU using a specific bit of the PHR, a combination of the specific bit, or a change of the specific bit sequence.

3. When Applying an Interleaver of a Predetermined Length Regardless of a PHR and a PSDU As an analysis on an initial channel environment is complete, when an operation environment of a transceiver is clear, a method of previously defining and operating a predetermined interleaver length is useful. That is, an optimal length of the interleaver is calculated according to an operation environment of a transceiver, and interleaving/de-interleaving is performed using an interleaver pattern appropriate to the length.

A P-FSK receiver according to an exemplary embodiment of the present invention may use a (133, 171) convolutional code with interleaving of a ½ encoding rate. Such a convolution code has been already widely used in IEEE 802.15.4 PHY, and when a soft decision viterbi decoder is used, a BER is further improved by 5 dB than that of a case of being not encoded.

Further, in an exemplary embodiment of the present invention, a soft decision viterbi decoder is used only in the mains-powered coordinator, and a hard decision viterbi decoder is used in a battery-powered endpoint device. This is because the soft decision viterbi decoder has a better performance than the hard decision viterbi decoder, but has high complexity and large power consumption.

In an exemplary embodiment of the present invention, data whitening can be performed to the PHR or the PSDU bit sequence using a pseudo noise9 sequence generator (PN9 sequence generator). This is because in an FSK system, when 0 or 1 is continuously repeated, it may be difficult to perform bit timing recovery and tracking. In this case, data whitening can be performed before or after the encoding the bit sequence. Further, data whitening can be performed to the interleaved bit sequence.

Further, in order to correctly recover a received signal, a P-FSK receiver according to an exemplary embodiment of the present invention uses spreading technique for obtaining an additional gain.

A spread method may first consider simple repetition. That is, when 0 is input, 0 is repeated the n times, and when 1 is input, 1 is repeated the n times. In this case, n is a spreading factor and may have a value of 0, 2, 4, 8, 16, or 32 (when n is displayed as a gain of a dB form, 0, 2, 4, 8, 16, and 32 are 0 dB, 3 dB, 6 dB, 9 dB, 12 dB, and 15 dB, respectively.

Further, in consideration of a characteristic of an FSK signal, a differential repetition pattern may be provided. In the FSK signal, when 0 or 1 is alternately received, a receiving terminal may be designed to improve frequency offset estimation and a timing recovery performance. For example, when n is 2, if 0 is input, the FSK signal is spread to "01", when 1 is input, the FSK signal is spread to "10", when n is 8, if 0 is input, the FSK signal is spread to "01010101", and when 1 is input, the FSK signal is spread to "10101010". Table 3 represents a spreading bit sequence for a spreading factor. In table 3, $b_i$ represents input bit, $c_k$ represents output bit.

TABLE 3

Spreading bit sequence for a spreading factor

| Spreading factor | Input bit (b0) = 0 | Input bit (b0) = 1 |
|---|---|---|
| 1 | (c0) = 0 | (c0) = 1 |
| 2 | (c0, c1) = 01 | (c0, c1) = 10 |
| 4 | (c0, . . . , c3) = 0101 | (c0, . . . , c3) = 1010 |
| 8 | (c0, . . . , c7) = 01010101 | (c0, . . . , c7) = 10101010 |
| 16 | (c0, . . . , c15) = 0101010101010101 | (c0, . . . , c15) = 1010101010101010 |
| 32 | (c0, . . . , c31) = 01010101010101010101010101010101 | (c0, . . . , c31) = 10101010101010101010101010101010 |

In this way, in addition to a simple repetition pattern of 0 and 1, in consideration of capable of simultaneously operating with other nodes, various orthogonal sequences may be additionally defined. For example, when interference is occurred with other nodes because of using a spreading code having a pattern in which "01" or "10" is repeated, high mutual correlation may be calculated. In this case, as an orthogonal sequence, a sequence having a good mutual correlation such as a Walsh code, a CAZAC sequence, and a gold sequence may be used.

Further, in an exemplary embodiment of the present invention, a spreading position may be a position after an interleaver, a position between a channel encoder and an interleaver, and a position in front of a channel encoder. According to the features of spreading sequence, data whitening may be applied or not applied. For example, when a ratio of '0' and '1' is guaranteed due to the spreading sequence, data whitening can be omitted. When both spreading and data whitening should be performed, a spreading code is positioned regardless of a position of data whitening.

A spreading factor may be changed according to an LECIM environment, and a data rate of an LECIM wireless transmission device is changed according to a spreading factor. In general, because data of an uplink is larger than that of a downlink, in an LECIM system according to an exemplary embodiment of the present invention, a symbol rate is determined to 40 KHz, 20 KHz, and 10 KHz, but a mandatory symbol rate for an uplink is determined to 40 KHz, and a mandatory symbol rate for a downlink is determined to 20 KHz.

Table 4 represents a data rate in consideration of a convolution code of a ½ encoding rate and a spreading factor.

TABLE 4

Data rate of LECIM wireless device

| | Symbol Rate | | |
|---|---|---|---|
| SF | 40 | 20 | 10 |
| 0 | 20 Kbps | 10 Kbps | 5 Kbps |
| 2 | 10 Kbps | 5 Kbps | 2.5 Kbps |
| 4 | 5 Kbps | 2.5 Kbps | 1.25 Kbps |
| 8 | 2.5 Kbps | 1.25 Kbps | 0.625 Kbps |
| 16 | 1.25 Kbps | 0.625 Kbps | 0.3125 Kbps |
| 32 | 0.625 Kbps | 0.3125 Kbps | 0.15625 Kbps |

In an exemplary embodiment of the present invention, because a battery-powered endpoint device should guarantee an SNR in order to enable a packet to transmit/receive, in order to enable the mains-powered coordinator to designate a spreading factor, a media access control (MAC)-based method may be used. In this case, in order to check whether the battery-powered endpoint device receives a packet in which the mains-powered coordinator transmits, communication through various spreading factors may be attempted.

In this case, channel environment is so changeable, access method that generates a connection between the mains-powered coordinator and the battery-powered endpoint device may be used. That is, in order to find a suitable format of a packet transmitted, the mains-powered coordinator can transmit a packet according to a predetermined order. Thereafter, the battery-powered endpoint device can reply channel environment to the mains-powered coordinator by transmitting a response about a level of the possibility of receiving a packet.

For example, the mains-powered coordinator may transmit a packet to the battery-powered endpoint device using a combination of a spreading factor and a symbol rate according to a predetermined order. Thereafter, when a signal of a level that can be received in the battery-powered endpoint device is detected, the battery-powered endpoint device may also transmit a packet according to a combination of a symbol rate and a spreading factor in which the mains-powered coordinator uses. Further, the battery-powered endpoint device may transmit a packet according to a value that is set within the packet.

Figure 7:
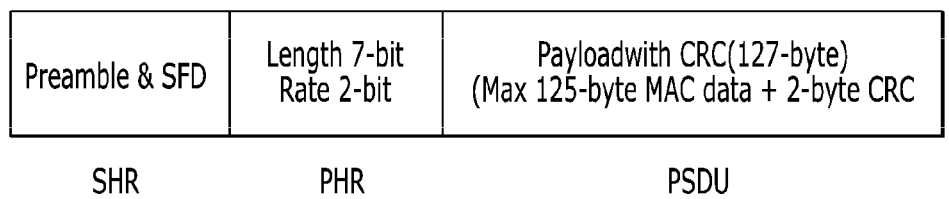
FIG. 7 is a diagram illustrating an LECIM PHY packet format according to an exemplary embodiment of the present invention.

FIG. 7 is a diagram illustrating an LECIM PHY packet format according to an exemplary embodiment of the present invention.

Referring to FIG. 7, an LECIM PHY packet according to an exemplary embodiment of the present invention includes an SHR, a PHR, and a PSDU.

The SHR includes a preamble and a start frame delimiter (hereinafter, referred to as an 'SFD'), and the SHR is modulated with an FSK method. This is because timing recovery, frequency offset estimation, and compensation can be performed using a continued FSK signal. Both the PHR and the PSDU may be modulated by a P-FSK method or a FSK method, and the P-FSK method may be applied only to the PSDU, and the FSK method may be applied to the PHR.

A preamble and an SFD of the SHR should have a predetermined signal structure, and in order to show an enough detection performance, a detection format such as sequence and spreading should be determined.

Thereafter, a receiving terminal performs blind detection according to a determined detection format. In general, blind detection is performed when detecting other useful information or a detection indicator of a signal that is received after a specific signal. For example, when several preamble sequences are available, blind detection may be used as use for instructing a detection method of an SFD or a detection method of a PHR and a PSDU. Alternatively, when several SFD sequences are available, a detection method of a PHR or a PSDU may be instructed with information that obtains through the several SFD sequences.

Blind detection is performed to instruct a method of analysis of restored bit, or a method of restoration of received bit sequence at PHY. That is, a information through blind detection may indicate things about operation of PHY related restoration of received bit sequence such as spreading rate, modulation method, channel code, interleaver and wireless positioning, and may indicate things about operation of MAC such as analysis method of PHR, system compatibilities and specified system mode information.

In this case, a detection method is used when instructing a modulation method or a spreading rate. For example, in the SFD, when several sequences or a combination of sequences is used, a predetermined combination may be generated in a spreading rate of a PHR and a spreading rate of a PSDU according to a specific sequence. That is, when detectable four sequence combinations exist in the SFD, by defining a set to the PHR and the PSDU with a method such as (32, 8), (16, 4), (8, 2), and (4, 1), a spreading factor may be instructed. Alternatively, a sequence combination in the SFD may instruct a spreading factor of the PHR, and a bit sequence (a length of 1 or more) of a predetermined portion may instruct a spreading factor of the PSDU within the PHR.

When a transmission format of a preamble, an SFD, and a PHR is previously determined (a modulation method, a spreading factor, etc.), the spreading factor of the PSDU may form a device that can be instructed by the PHR, or set a spreading factor through communication in an MAC layer.

The SHR and the PHR use a mandatory symbol rate. That is, in a downlink, a symbol rate of 20 KHz is used, and in an uplink, a symbol rate of 40 KHz is used. The PSDU uses a value that is designated in the PHR as a symbol rate. Although the symbol rate is designated, the mandatory symbol rate defined in the PHR may be changed according to a result of the blind detection.

First, the preamble repeatedly uses "01010101" sequence. This is because in an FSK system, when "01010101" sequence is used, a synchronization performance can be improved. The number of repetition should be minimum 16 times, and in order to well detect a preamble even in an LECIM wireless environment, the "01010101" sequence should be fully repeated.

The SFD can repeatedly use a specific sequence. For example, 16 bit SFD sequence "0110111101001110" that is used in IEEE 802.15.4 g may be repeated several times. The number of repetition is minimum 4 times, and even in an LECIM wireless environment, an SFD may be well detected. In this case, when the SFD sequence is repeated minimum 4 times, a total length of the SFD becomes 64 bits or more. When a total length of the SFD is selected to minimum 64 bits or more, if a correlation is taken to a received signal and SFD sequence, when they are accurately matched, a gain of 18 dB ($10*\log_{10}(64)$) occurs, and thus when an SFD sequence is detected, it is advantageous further than a short sequence. Further, in order to obtain a detection performance similar to a payload and a PHR that takes spreading, an SFD sequence of a relatively long length is used.

At a location having a good LECIM radio channel environment, by repeatedly using a short sequence, when taking a correlation, because a filter using a short sequence can be used, complexity is lowered according to an application and low power can be embodied.

When a short sequence is repeatedly used, each repeated SFD sequence may have the same phase, but when transmitting additional control information (basic information about a format of a packet to be transmitted later and feedback information that transmits to a transmitting terminal), the additional control information may be transmitted with different phases. For example, a method of inverting and transmitting a partial segment of a repeated sequence may be considered. As described above, when detecting an SFD in a receiving terminal using a combination of a short sequence, the SFD has the same complexity, but there is a merit that additional information may be found out according to a phase change or an inverted state of each sequence. In addition, the SFD can repeatedly use a specific sequence if performance of SFD detection is improved without affecting to later bit.

Sequence having predetermined length may be used as the SFD when repeated sequence may not be used. A plurality of sequences can be possible for the SFD when blind detection is previously performed. In this case, the length of the plurality of sequences may be different from each other, and can affect to later bits when the length of the plurality of sequences differs from each other.

Sequence of predetermined length may be added in front of the SFD when there is a need to define an extension mode of specified system. In this case, a receiver that can identify the sequence of predetermined length added in front of the SFD can perform an extension mode of specified system.

The PHR and the PSDU may be modulated to FSK or P-FSK. A length of the PHR is determined, and the PHR may include a length field of 7 bits, a symbol rate field of 2 bits, and a spreading factor field of 3 bits. Further, the PHR additionally includes a parity check bit of 1 bit or more, and when detecting an error of the PHR that is received in the receiving terminal, a parity check bit may be used. The parity check bit may be generated by combination of the bits included the PHR. The receiving terminal determines whether the PHR has an error through a parity check bit, and if the PHR has an error, a processing of the PSDU is stopped.

Further, when stability of an FSK demodulator for the PHR is considered, it may be necessary to randomly generate a pattern of a bit. When the PHR is spread, a pattern of 0 and 1 (or −1 and 1) may be somewhat randomly set from a spreading sequence, but when the spreading sequence is not applied, it is necessary to randomly adjust a ratio of 0 and 1 of the PHR.

In order to adjust a bit ratio of the PHR, a transmitting terminal can selectively or compulsorily apply whitening to the PHR. The receiving terminal should always apply de-whitening to a signal to which whitening is compulsorily applied. However, with respect to a signal to which whitening is selectively applied, the receiving terminal may perform a blind detection or know whether whitening is applied with a bit pattern of a specific portion of a PHR.

When performing a blind detection, the receiving terminal determines appropriateness (whether a field value is appropriate or whether a field value exists within an effective range) of the PHR when de-whitening is applied and when de-whitening is not applied and applies de-whitening.

The receiving terminal instructs a value that can determine whether whitening is applied at a specific bit position of the PHR. For example, the receiving terminal may notify whether whitening is applied with 1 bit at a specific position of the PHR or whether whitening is applied (it is assumed that '01' is a PHR to which whitening is not applied, and '10' is a PHR to which whitening is applied) using a bit pattern of 2 bits or more.

The PSDU includes data of maximum 127 bytes including a cyclic redundancy checking (CRC) bit of 16 bits.

Figure 8:
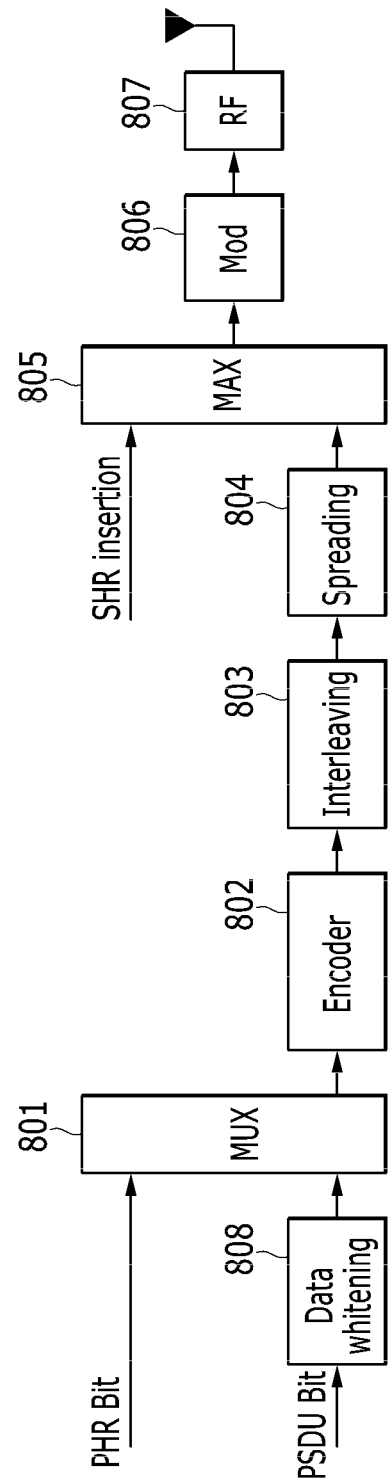
FIG. 8 and FIG. 9 are a diagram illustrating packet flow in a transmitting/receiving terminal according to an exemplary embodiment of the present invention.
Figure 9:
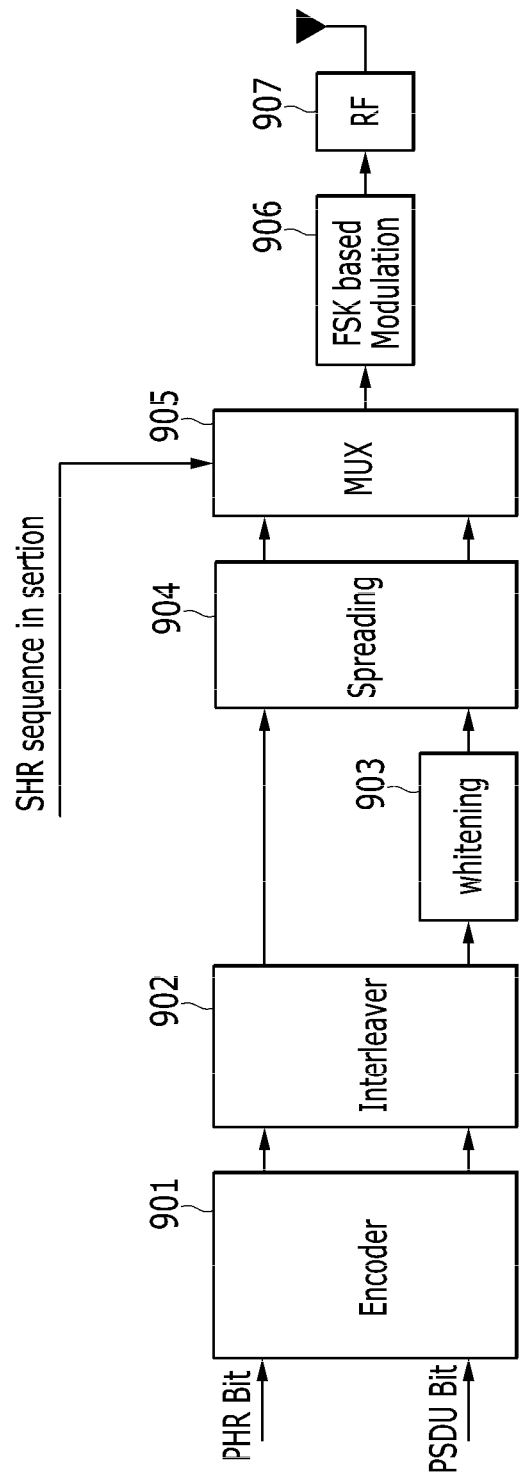

FIG. 8 and FIG. 9 are a diagram illustrating packet flow in a transmitting/receiving terminal according to an exemplary embodiment of the present invention.

Referring to FIG. 8, the PHR and the PSDU are grouped into one bit string through a first multiplexer (MUX) 801. In this case, the above-described data whitening 808 is applied to a PSDU bit. After the PHR and the PSDU are grouped into one bit string, encoding unit 802 and interleaving unit 803 are performed. In this case, turbo encoding or convolution encoding may be used as an encoding method. By convolution-encoding together the PHR and the PSDU, the PHR is protected in the same level as that of the PSDU.

A spreading 804 of a transmitting terminal spreads a bit string of the PHR and the PSDU. In this case, a spreading position may be a position after interleaving 803, a position between encoding unit 802 and interleaving unit 803, and a position in front of encoding unit 802.

Referring to FIG. 8, after encoding and interleaving are performed, by determining a mandatory spreading factor to 4, the PSDU is spread, and by using a designated value to the PHR, the PSDU is spread.

Thereafter, the spread PHR and PSDU are grouped into one bit string with an SHR through a second MUX 805. In this case, in the transmitting terminal, in order to improve an SNR per bit of a received signal, a method of repeating a packet with a method similar to spreading may be considered. In this case, a method of repeating all packets from a preamble to a PSDU and a method of repeating only a portion of a packet may be considered. When an entire packet is repeated, an endpoint device may use a method of repeatedly transmitting according to an instruction of a media access control layer (MAC layer) and a method of repeatedly transmitting itself without an instruction of an MAC layer.

When only a portion of a packet is repeated, a method of commonly including a preamble to an SFD in the packet and repeating only a PHR and a PSDU or a method of commonly including a preamble to a PHR in a packet and repeating only a PSDU may be considered.

In this case, in order for a demodulator of the receiving terminal to process a packet by short delay, a method of transmitting again a repetition portion after transmitting all repetition portions may be used.

For example, when repeating the PHR and the PSDU, a transmission packet may become preamble+SFD+PHR+PSDU+PHR+PSDU+PHR+PSDU+... , and when repeating the PSDU, a transmission packet may become preamble+SFD+PHR+PSDU+PSDU+PSDU+PSDU+PSDU+...

In addition, when channel state is unstable, the SFD or preamble also can be repeated. That is, preamble+SFD+PHR+PSDU+SFD+PHR+PSDU+SFD+PHR+PSDU+...

or, preamble+SFD+PHR+PSDU+preamble+SFD+PHR+PSDU+preamble+SFD+PHR+PSDU+...

is possible.

In this case, a repetition portion and the number of repetition are determined similarly to a method of determining a spreading factor. That is, a repetition portion and the number of repetition are determined by communication with an MAC layer or are determined to a sequence combination of the SFD or to a value that is instructed in an information field of the PHR.

Thereafter, a bit string that is grouped by repeating in the second MUX 805 is modulated through a modulator 806 and is transmitted via an amplifier 807. In this case, a method in which the modulator 806 modulates a bit string is the same as the above-described method.

Referring to FIG. 9, encoding 901 and interleaving 902 of the PHR bit and the PSDU bit can be performed in turn. Thereafter, the PSDU bit that is performed data whitening 903 and the PHR bit that is interleaved are respectively spread through a spreading 904 and the spread bit string is multiplexed through a MUX 905 with the SHR that is inserted to MUX 905. Thereafter, the multiplexed bit string is modulated through a modulator 906 and is transmitted via an amplifier 907. In this case, a method in which the modulator 906 modulates the multiplexed bit string is the same as the above-described method.

Table 5 represents a downlink budget that is calculated according to an exemplary embodiment of the present invention, and Table 6 represents an uplink budget that is calculated according to an exemplary embodiment of the present invention.

Before calculating a link budget, the above-described packet is transmitted/received in an urban_large environment, and a use channel is 900 MHz band. Transmission power according to a domestic regulation is 10 dBm, and as described in Table 1, received power in battery-powered endpoint device is −118.4 dBm, and received power in the mains-powered coordinator is −117.4 dBm.

When using a P-FSK modulation method, an energy per bit to noise spectral density ratio (Eb/No) for achieving a target BER $10^{-5}$ is 10 dB in a coherent receiver and is 11 dB in a non-coherent receiver. When (133, 171) convolutional channel coding of ½ encoding rate is used, a soft decision decoding (SDD) has a gain of 5 dB, and a hard decision decoding (HDD) has a gain of 3 dB.

Calculation results of a link budget of a downlink (coordinator→endpoint device) and an uplink (endpoint device→coordinator) based on this are represented in Tables 5 and 6.

TABLE 5 downlink budget
Downlink

| Parameters | unit | Value |
| --- | --- | --- |
| Symbol rate [Rb] | KHz | 20 |
| Bandwidth [BW] | MHz | 0.08 |
| Rx power at Endpoint [Pr] | dBm | −118.4 |
| Receiver AWGN noise floor [N = −174 + 10log(BW)] | dBm | −125.0 |
| RF noise figure of Endpoint [Nf] | dB | 7.0 |
| Average noise power [Pn = N + Nf] | dBm | −118.0 |
| Minimum Eb/No [S] | dB | 8.0 |
| Implementation loss [I] | dB | 3.0 |
| Processing gain [PG] | dB | 15 |
| Link Margin [LM = Pr − Pn − S − I + PG] | dB | 3.6 |
| Proposed Min. Rx Sensitivity Level(Endpoint) [Pmin] | dBm | −122.0 |

TABLE 6 uplink budget
Uplink

| Parameters | unit | Value |
| --- | --- | --- |
| Symbol rate [Rb] | KHz | 40 |
| Bandwidth [BW] | MHz | 0.16 |
| Rx power at Collector [Pr] | dBm | −117.4 |
| Receiver AWGN noise floor [N = −174 + 10log(BW)] | dBm | −122.0 |
| RF noise figure of Collector [Nf] | dB | 7.0 |
| Average noise power [Pn = N + Nf] | dBm | −115.0 |
| Minimum Eb/No [S] | dB | 5.0 |
| Implementation loss [I] | dB | 3.0 |
| Processing gain [PG] | dB | 15 |
| Link Margin [LM = Pr − Pn − S − I + PG] | dB | 4.6 |
| Proposed Min. Rx Sensitivity Level(Collector) [Pmin] | dBm | −122.0 |

Referring to Tables 5 and 6, because a non-coherent receiver and a hard decision decoder are considered, minimum Eb/No of a downlink is 8 dB (11−3=8), and because an a coherent receiver and a soft decision decoder are considered, minimum Eb/No of an uplink is 5 dB (10−5=5). In this case, a symbol rate of the downlink is 20 kHz, which is a mandatory symbol rate, and a symbol rate of an uplink is 40 kHz.

In 900 MHz and urban_large environments, because a received signal is feeble, in order to restore the received signal, when a spreading factor becomes 32 (15 dB), a link margin becomes larger than 0.

Further, in both a downlink and an uplink, a minimum rx sensitivity level is −122 dB. Even if a coordinator and an endpoint device each represent different performances in a receiver structure and viterbi decoder characteristics, by lowering a noise level by adjusting an asymmetrical symbol rate, this enables the coordinator and the endpoint device to have the same receiving terminal sensitivity level.

Unlike values that are shown in Tables 5 and 6, because a path loss is relatively small in a suburban environment or a rural environment, even if the spreading factor uses a small value of 0, 2, or 4, while satisfying a target BER, data can be restored.

According to an exemplary embodiment of the present invention, in order to improve a bit error rate while not greatly increasing complexity of hardware, a packet can be modulated and generated, and when an endpoint device receives a packet, power consumption can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of modulation, the method comprising:
    mapping each bit of a bit string to at least four symbols;
    allocating a modulation frequency to each of the symbols;
    allocating a position to be transmitted in a duration of each of the symbols; and
    modulating each of the symbols based on the modulation frequency and the position,
    wherein the allocating comprises dividing the duration of the symbol into a plurality of positions and selecting a position at which the allocated modulation frequency is to be transmitted and a position at which the allocated modulation frequency is not to be transmitted.

2. The method of claim 1, wherein the mapping of the bit string comprises
    dividing the bit string into 00, 01, 10, and 11, and the allocating of the modulation frequency comprises
    allocating a first modulation frequency to the 00 and 01; and
    allocating a second modulation frequency different from the first modulation frequency to the 10 and 11.

3. The method of claim 2, wherein the allocating of the position comprises
    allocating a first position of the duration to the 00 and 10; and
    allocating a second position different from the first position of the duration to the 01 and 11.

4. A method of generating a packet, the method comprising:
    generating a first bit string by multiplexing a physical layer header (PHR) bit and a physical layer service data unit (PSDU) bit with synchronization header (SHR) bits; and
    modulating the first bit string with at least one of a frequency shift keying (FSK) method and a method in which position information is reflected to the FSK method,
    wherein each of symbols in the first bit string is modulated based on modulation frequency and position that are allocated to the each of the symbols,
    wherein, when the position is allocated to the each of the symbols, the duration of the symbol is divided into a plurality of positions, and a position at which the allocated modulation frequency is to be transmitted and a position at which the allocated modulation frequency is not to be transmitted are selected.

5. The method of claim 4, wherein the PHR bit comprises at least one parity check bit which is generated by combination of the bits which are included in the PHR.

6. The method of claim 4, further comprising
    encoding the PHR bit and the PSDU bit,
    wherein the generating of the first bit string comprises multiplexing the encoded PHR bit and the encoded PSDU bit with the SHR bit.

7. The method of claim 6, further comprising
    interleaving the encoded PHR bit and the encoded PSDU bit,
    wherein the generating of the first bit string comprises multiplexing the interleaved PHR bit and the interleaved PSDU bit with the SHR bit.

8. The method of claim 7, wherein the interleaving the encoded PHR bit and the encoded PSDU bit comprises
    applying a first length of interleaving to the encoded PHR bit; and
    applying a second length of interleaving to the encoded PSDU bit, wherein the second length of interleaving is different from the first length of interleaving.

9. The method of claim 7, further comprising
    data-whitening the interleaved PSDU bit,
    wherein the generating of the first bit string comprises multiplexing the interleaved PHR bit and the data-whitened PSDU bit with the SHR bit.

10. The method of claim 9, further comprising
    applying spreading code to the interleaved PHR bit and the data whitened PSDU bit,
    wherein the generating of the first bit string comprises multiplexing the spread PHR bit and the spread PSDU bit with the SHR bit.

11. The method of claim 10, wherein the spreading code has a pattern in which "01" or "10" is repeated.

12. The method of claim 4, wherein a second bit string of the first bit string comprises a bit string of the SHR bit, and
    a third bit string different from the second bit string of the first bit string comprises a bit string of the PHR bit and a bit string of the PSDU bit.

13. The method of claim 12, wherein a preamble has a pattern in which 0 and 1 are alternately repeated, wherein the SFD is generated by a predetermined sequence configured by "0" and "1" or a combination of the predetermined sequence.

14. The method of claim 4, wherein a second bit string of the first bit string comprises a bit string of the SHR bit and a bit string of the PHR bit, and
    a third bit string different from the second bit string of the first bit string comprises a bit string of the PSDU bit.

15. The method of claim 4, further comprising repeatedly transmitting a portion of the modulated first bit string by a predetermined number of times.

16. The method of claim 4, wherein the PSDU bit comprises a cyclic redundancy checking (CRC) bit.

17. The method of claim 4, wherein the SHR bit comprises a preamble; and
   a start frame delimiter (SFD) which is comprised of at least one sequence selected from a predetermined SFD sequence group and repeated a predetermined number of times.

18. The method of claim 4, wherein the modulating of the first bit string comprises
   mapping each bit of the first bit string to at least four symbols;
   allocating a modulation frequency to each of the symbols
   allocating a position to be transmitted in a duration of each of the symbols; and
   modulating each of the symbols based on the modulation frequency and the position.

19. A method of receiving a packet in a receiver, the method comprising:
   demodulating a packet that is received from an antenna with at least one of a frequency shift keying (FSK) method and a method in which position information is reflected to the FSK method;
   de-interleaving the demodulated packet;
   decoding the de-interleaved packet; and
   demultiplexing the decoded packet to a physical layer header (PHR) bit and a physical layer service data unit (PSDU) bit,
   wherein each of symbols in the received packet is modulated based on modulation frequency and position that are allocated to the each of the symbols,
   wherein, when the position is allocated to the each of the symbols, the duration of the symbol is divided into a plurality of positions, and a position at which the allocated modulation frequency is to be transmitted and a position at which the allocated modulation frequency is not to be transmitted are selected.

20. The method of claim 19, wherein the decoding of the de-interleaved packet comprises
   decoding the de-interleaved packet using soft decision viterbi algorithm by a coordinator of a sensor network when the receiver is included in the coordinator of the sensor network; and
   decoding the de-interleaved packet using hard decision viterbi algorithm by an endpoint device of a sensor network when the receiver is included in the endpoint device of the sensor network.

* * * * *